(12) United States Patent
Tsai et al.

(10) Patent No.: US 11,439,240 B2
(45) Date of Patent: Sep. 13, 2022

(54) ADJUSTABLE SEAT

(71) Applicant: Foxtron Vehicle Technologies Co., Ltd., New Taipei (TW)

(72) Inventors: Tsu-Yi Tsai, New Taipei (TW); Chia-Hao Hsu, New Taipei (TW)

(73) Assignee: Foxtron Vehicle Technologies Co., Ltd., New Taipei (TW)

( * ) Notice: Subject to any disclaimer, the term of this patent is extended or adjusted under 35 U.S.C. 154(b) by 0 days.

(21) Appl. No.: 17/218,531

(22) Filed: Mar. 31, 2021

(65) Prior Publication Data

US 2022/0202189 A1 Jun. 30, 2022

(30) Foreign Application Priority Data

Dec. 31, 2020 (CN) .......................... 202011620788.8

(51) Int. Cl.
*A47C 7/56* (2006.01)
*A47C 7/58* (2006.01)
*B60N 2/10* (2006.01)

(52) U.S. Cl.
CPC ................ *A47C 7/563* (2013.01); *A47C 7/58* (2013.01); *B60N 2/10* (2013.01)

(58) Field of Classification Search
CPC .. B60N 2/203; B60N 2/2863; B61D 33/0028; A47C 7/56

USPC .............. 297/92, 96–68, 101–102
See application file for complete search history.

(56) References Cited

U.S. PATENT DOCUMENTS 3,743,350 A * 7/1973 Allen ................. A47C 17/1756
5/47
3,986,218 A * 10/1976 Mizelle ................. A47C 17/16
5/45
5,098,154 A * 3/1992 Emery ................. B60N 2/0292
297/328

\* cited by examiner

*Primary Examiner* — Sarah B McPartlin
(74) *Attorney, Agent, or Firm* — ScienBiziP, P.C.

(57) ABSTRACT

An adjustable seat includes a carrier, a seat body, a first linking rod, a second linking rod, a sliding mechanism, and an adjustment block. The seat body is arranged on the carrier and includes a seat surface switchable between a first direction and a second direction. The first linking rod is hinged to the seat body and the carrier. The second linking rod is hinged to the seat body and the carrier. The sliding mechanism includes a slide rail and a slide block slidably engaged with the slide rail. The slide block is hinged to the seat body. The slide rail is hinged to the first linking rod and the second linking rod. The adjustment block is slidably coupled to the slide rail or the seat body for switching the seat surface between the first orientation and the second orientation.

13 Claims, 11 Drawing Sheets

ADJUSTABLE SEAT

FIELD

The subject matter herein generally relates to seats, and more particularly to an adjustable seat.

BACKGROUND

Seats in vehicles are generally fixed at certain positions. In vehicles such as cars, trains, and planes, the seat generally cannot be adjusted to face an opposite direction.

BRIEF DESCRIPTION OF THE DRAWINGS

Implementations of the present disclosure will now be described, by way of embodiments, with reference to the attached figures.

DETAILED DESCRIPTION

Figure 1:
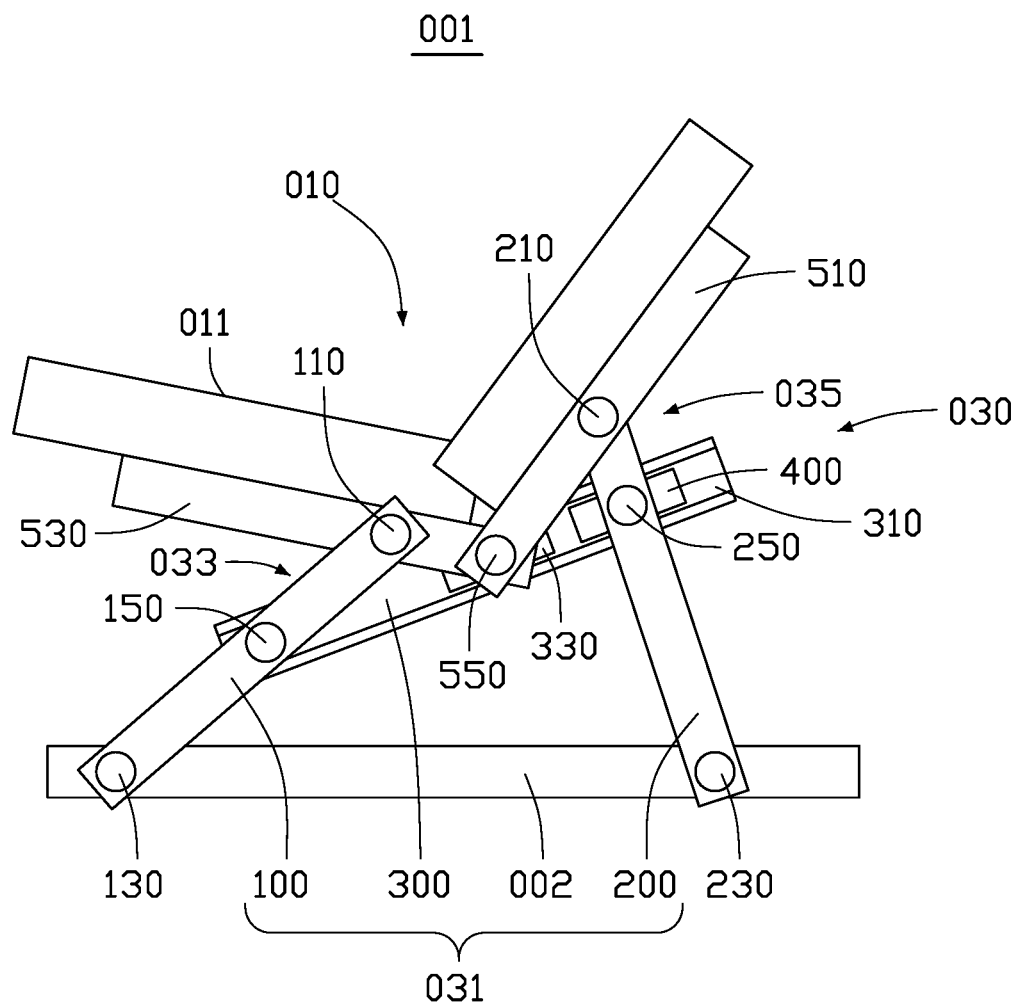
FIG. 1 is a schematic diagram of an adjustable seat according to an embodiment of the present disclosure when a seat surface of the adjustable seat is in a first orientation.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 shows a first embodiment of an adjustable seat 001 for seating a human body. The adjustable seat 001 includes a carrier 002, a seat body 010, and a turning device 030. The turning device 030 includes a first linking rod 100, a second linking rod 200, and a sliding mechanism 300. The seat body 010 includes a seat surface 011, which can switch between a first orientation and a second orientation. The first linking rod 100 includes a first hinged end 110 and a second hinged end 130. The first hinged end 110 is hinged to the seat body 010, and the second hinged end 130 is hinged to the carrier 002. The second linking rod 200 includes a third hinged end 210 and a fourth hinged end 230. The third hinged end 210 is hinged to the seat body 010, and the fourth hinged end 230 is hinged to the carrier 002. The sliding mechanism 300 includes a slide rail 310 and a slide block 330. The slide rail 310 and the slide block 330 can be slidably locked together. The slide block 330 is hinged to the seat body 010. The slide rail 310 includes a fifth hinged end 150 and a sixth hinged end 250. The fifth hinged end 150 is hinged to the first linking rod 100, and the sixth hinged end 250 is hinged to the second linking rod 200. The sixth hinged end 250 is arranged on an adjustment block 400. The adjustment block 400 is movable within a range of movement, so that the seat surface 011 rotates between the first orientation and the second orientation.

The first linking rod 100, the second linking rod 200, the carrier 002, and the sliding mechanism 300 form a four-rod linkage structure 031. Any one of the first linking rod 100, the second linking rod 200, or the sliding mechanism 300 can be used to adjust positions of the first hinged end 110 and the second hinged end 130 to cause a distance between the first hinged end 110 and the carrier 002 to be greater than a distance between the third hinged end 210 and the carrier 002, or cause the distance between the third hinged end 210 and the carrier 002 to be greater than the distance between the first hinged end 110 and the carrier 002. The seat body 010 is supported by the first linking rod 100, the second linking rod 200, and the sliding mechanism 300. When the relative positions of the first hinged end 110 and the third hinged end 210 are changed, a posture of the seat body 010 can be changed.

Figure 2:
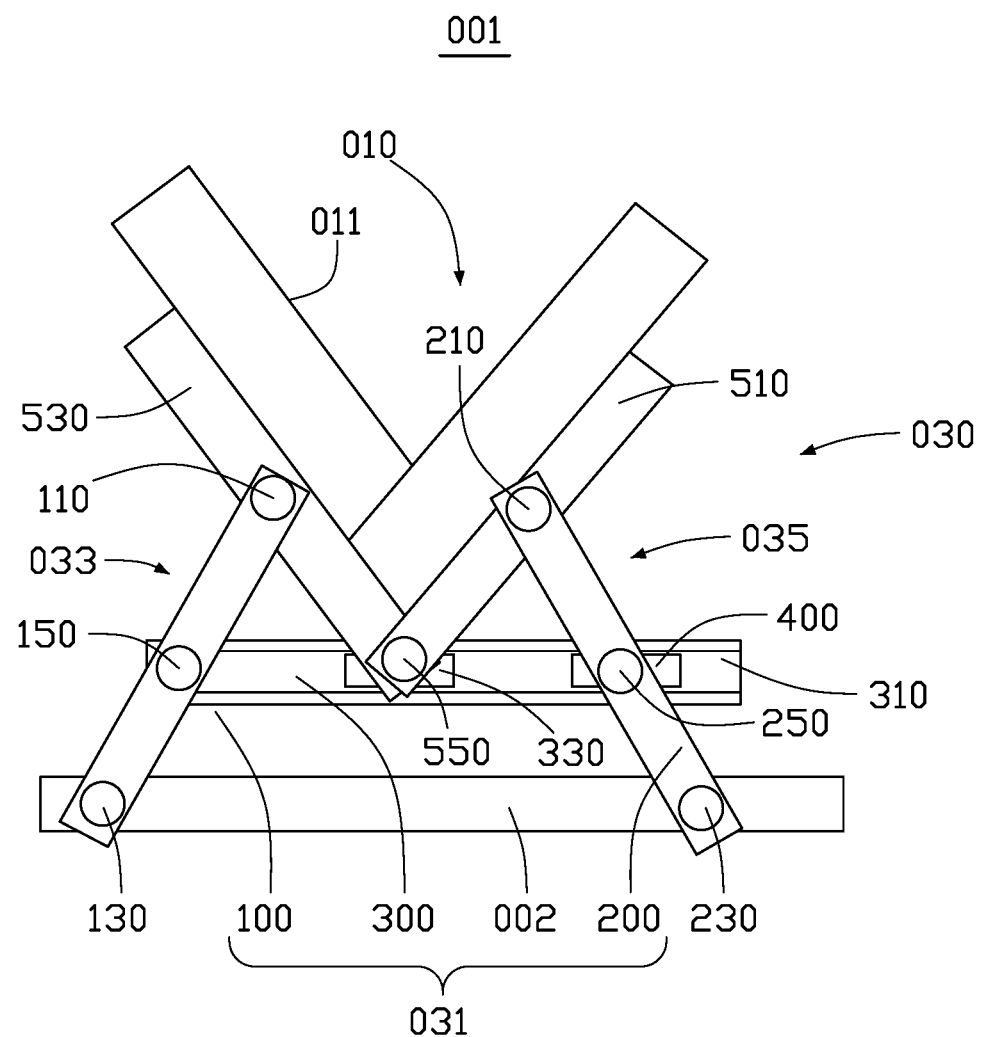
FIG. 2 is a schematic diagram showing the seat surface in FIG. 1 between the first orientation and a second orientation.
Figure 3:
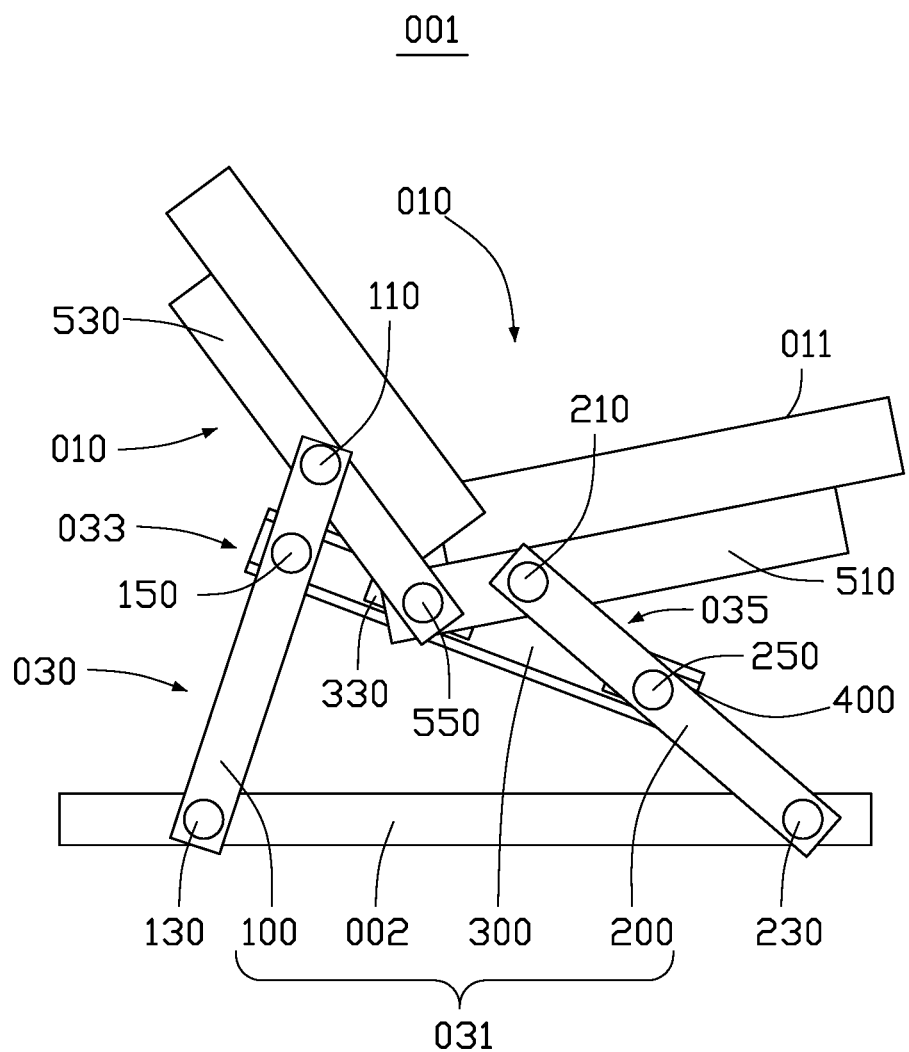
FIG. 3 is a schematic diagram showing the seat surface in FIG. 1 in the second orientation.

The first hinged end 110, the fifth hinged end 150, and the slide block 330 form a first triangular structure 033, and the third hinged end 210, the sixth hinged end 250, and the slide block 330 form a second triangular structure 035. The first triangular structure 033 and the second triangular structure 035 reduce a degree of freedom of the aforementioned four-bar structure 031 in turn. Therefore, the adjustable seat 001 provided with the adjustment block 400 restores the degree of freedom reduced by the first triangular structure 033, and the slide block 330 slidably engaged with the sliding mechanism 300 restores the degree of freedom reduced by the second triangular structure 035, so that the four-rod linkage structure 031 can move freely. When either of the slide block 330 or the adjustment block 400 is locked in position, the position of the seat body 010 will be locked due to the reduced degree of freedom. Referring to FIGS. 1-3, the four-rod linkage structure 031 formed by the first linking rod 100, the second linking rod 200, the bearing member 002, and the sliding mechanism 300 can change the orientation of the seat surface 011 of the seat body 010 between the first orientation and the second orientation. The first direction is substantially opposite the second direction, so that a passenger on the seat surface 011 can face the first direction or the second direction.

The seat body 010 is formed by combining a first piece 510 and a second piece 530. Specifically, an end of the first piece 510 adjacent to the second piece 530 is provided with a first hinge hole (not shown), an end of the second piece 530 adjacent to the first piece 510 is provided with a second hinge hole (not shown), and a connecting shaft 550 is received through the first hinge hole and the second hinge hole, so that the first piece 510 and the second piece 530 are hinged together, and an angle between the first piece 510 and the second piece 530 can be changed. A change in the angle between the first piece 510 and the second piece 530 can be used to adapt to a change in position of the first hinged end 110 and the third hinged end 210.

The connecting shaft 550 not only serves as a hinge axis between the first piece 510 and the second piece 530, but also serves as a hinge axis between the seat body 010 and the slide block 330, thereby achieving a simplified structure, and by changing the angle between the first piece 510 and the second piece 530, the change in positions of the first hinged end 110 and the third hinged end 210 is facilitated.

The first piece 510 and the second piece 530 divide a circumference of the connecting shaft 550 into a superior angle side and an inferior angle side. The seat surface 011 is located on the inferior angle side. When the seat surface 011 is in the first orientation, the first piece 510 forms a seat portion that supports a human body, and the second piece 530 forms a back portion that supports a human body. When the seat surface 011 is in the second orientation, the first piece 510 forms the back portion that supports a human body, and the second piece 530 forms the seat portion that supports a human body.

When the seat body 010 moves between the first orientation and the second orientation, the slide block 330 coupled to the seat body 010 will move along the slide rail 310. The slide rail 310 is a linear slide rail, and the slide block 330 is a linear slide block. Because of the first linking rod 100 and the second linking rod 200, the slide block 330 moves along the slide rail 310 in an arcuate motion relative to the carrier 002. Therefore, a cost of the adjustable seat 001 is reduced since the linear slide rail and the linear slide block have a lower cost than an arcuate slide rail and an arcuate slide block.

The adjustment block 400 slides to achieve movement within a range of motion. Specifically, the adjustment block 400 is a slide block arranged on the slide rail 310. The slide rail 310 follows a movement of the fifth hinged end 150 on the first linking rod 100, and the adjustment block 400 follows a movement of the sixth hinged end 250 on the second linking rod 200, so that a relative change in position of the slide rail 310 and the adjustment block 400 is adapted to a relative change in position of the fifth hinged end 150 and the sixth hinged end 250, respectively.

Due to the setting of the adjustment block 400 and the slide block 330, both the first triangular structure 033 and the second triangular structure 035 have movable vertices, so that the four-rod linkage structure 031 can move freely. After the four-rod linkage structure 031 moves to a desired position, the position of the seat body 010 is fixed, so that the passenger can sit on the seat body 010 stably.

Figure 4:
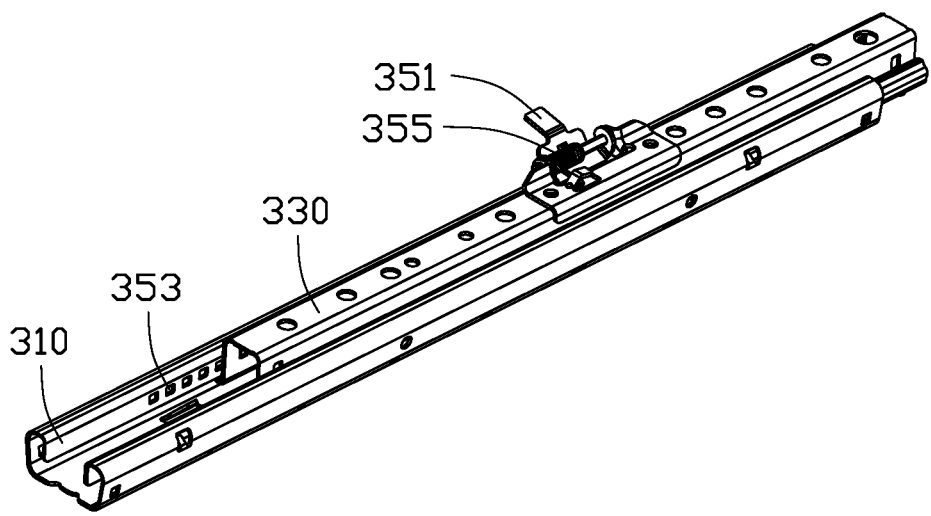
FIG. 4 is a schematic perspective view of a sliding mechanism.
Figure 5:
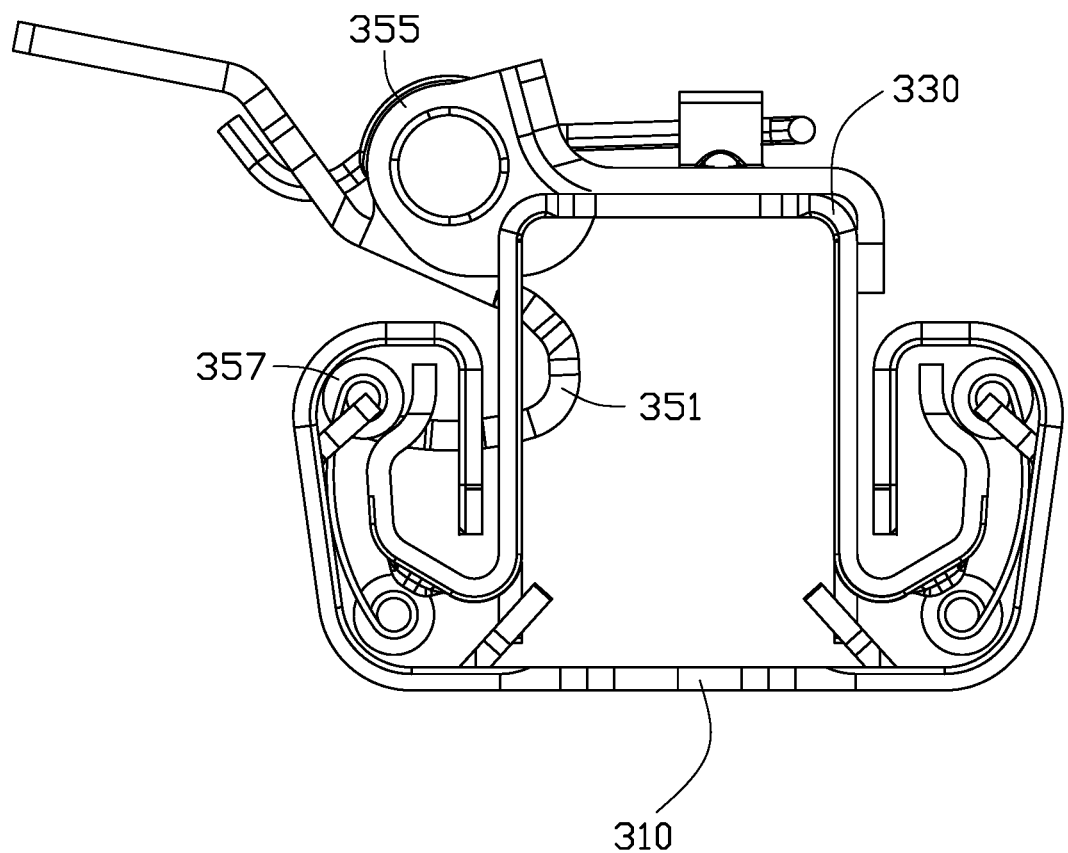
FIG. 5 is a cross-sectional view of the sliding mechanism according to an embodiment of the present disclosure.

Referring to FIGS. 4 and 5, the sliding mechanism 300 is provided with a locking assembly for locking the relative position of the slide block 330 on the slide rail 310. The locking assembly includes a plug 351 and a plurality of holes 353. The plug 351 is arranged on the slide block 330 and follows the slide block 330 to move relative to the slide rail 310. The plurality of holes 353 is arranged at intervals along an extension direction of the slide rail 310. The plug 351 is inserted into a corresponding one of the holes 353 to fix the relative position of the slide block 330 and the slide rail 310.

Figure 6:
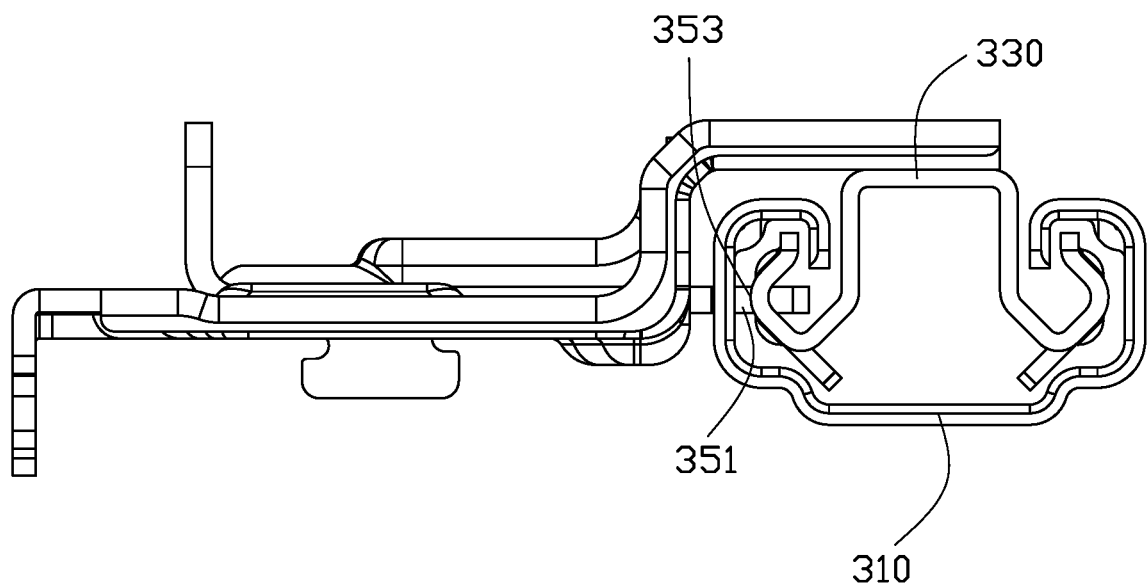
FIG. 6 is a cross-sectional view of the sliding mechanism according to another embodiment of the present disclosure.

Referring to FIG. 6, in another embodiment, the locking component is arranged outside the slide rail 310, and the plug 351 can be directly inserted into the corresponding hole 353.

In one embodiment, the plug 351 and the slide block 330 are rotationally coupled by a pin shaft (not labeled). The plug 351 is rotated around the pin shaft to switch between a locked state and an unlocked state. The plug is in the locked state when inserted into the hole 353 and in the unlocked state when located outside the hole 353. The locked state is maintained by a return member 355 located between the plug 351 and the slide block 330. In one embodiment, the return member 355 is a torsion spring. The return member 355 maintains the plug 351 in the locked state when an external force is not applied on the return member 355. When an external force is applied on the return member 355, the plug 351 is switched to the unlocked state so that the slide block 330 can slide along the slide rail 310. After the slide block 330 slides to the desired position, the external force is released so that the plug 351 is inserted into the corresponding hole 353, so that the slide block 330 and the slide rail 310 are locked.

In order to reduce friction between the slide rail 310 and the slide block 330, ball bearings 357 are provided between the slide block 330 and the slide rail 310. Thus, a driving force required for the slide block 330 to move along the slide rail 310 is reduced.

In operation, the plug 351 can be operated by one hand of a user, and another hand of a user can drive the adjustable seat 001 to rotate to another position. Then, the plug 351 is released to lock the positions of the slide block 330 and the slide rail 310.

In another embodiment, a first driving motor (not shown) can be provided in the adjustable seat 001 to move the slide block 330 along the slide rail 310, and a second driving motor (not shown) can be provided to switch the plug 351 from the locked state to the unlocked state. The first driving motor and the second driving motor can further facilitate operation by a user.

Figure 7:
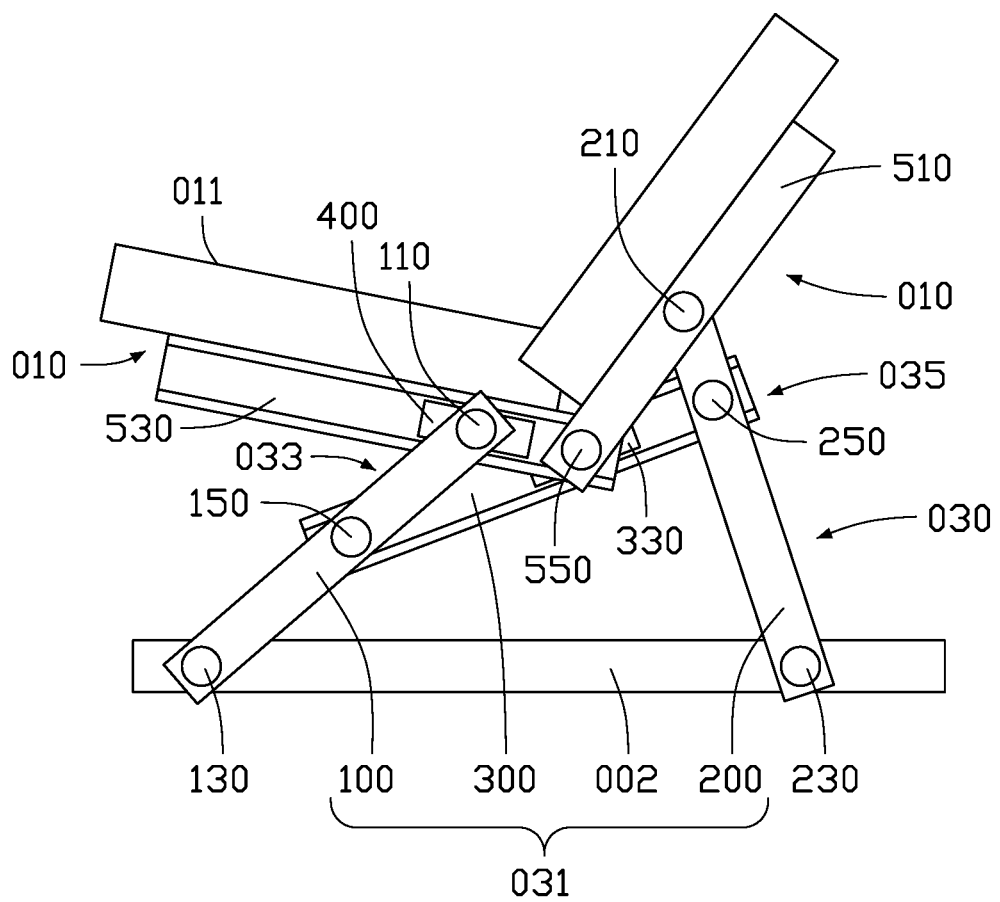
FIG. 7 is a schematic diagram of the adjustable seat according to another embodiment of the present disclosure when the seat surface is in the first orientation.
Figure 8:
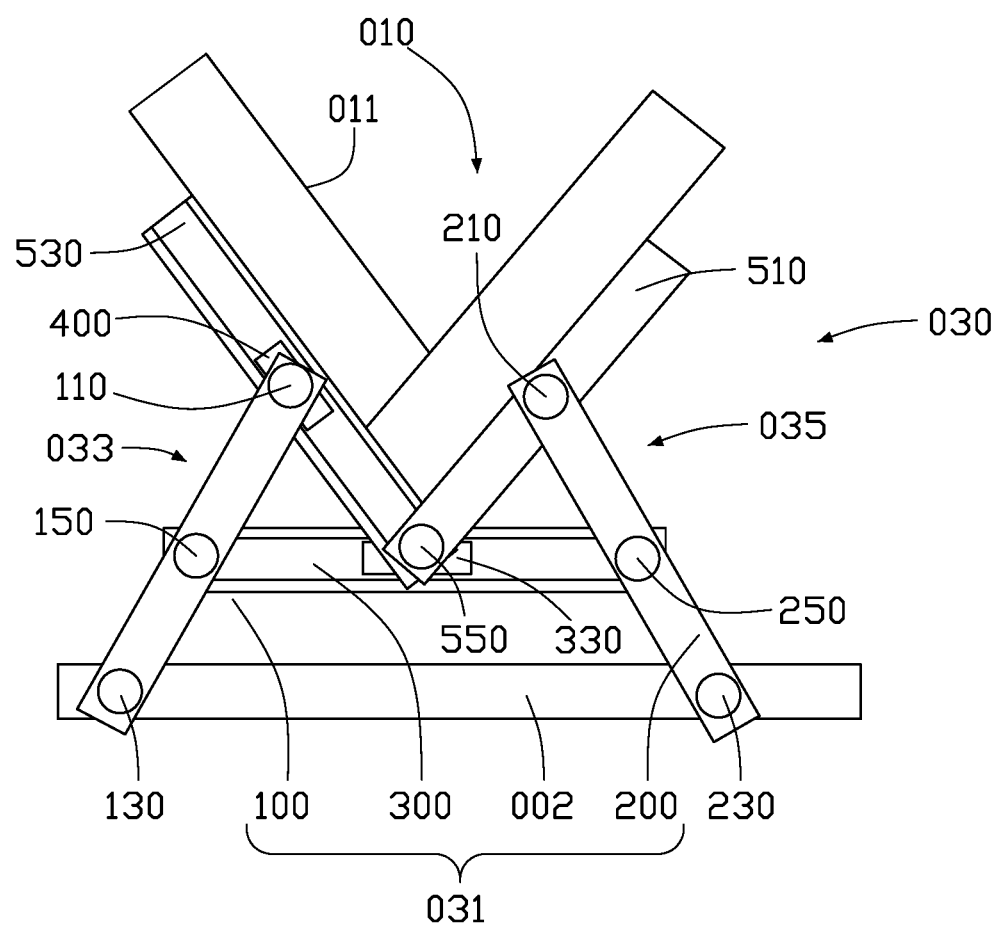
FIG. 8 is a schematic view showing the seat surface in FIG. 7 between the first orientation and the second orientation.
Figure 9:
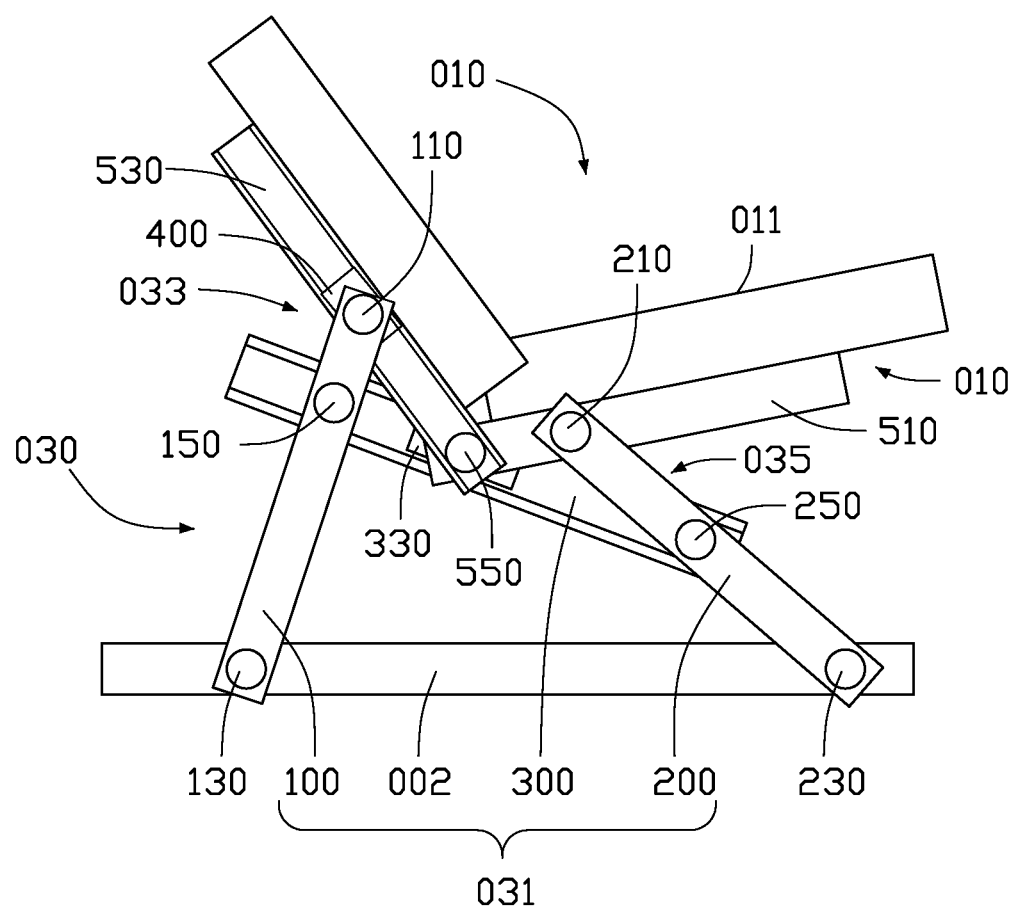
FIG. 9 is a schematic view showing the seat surface in FIG. 7 in the second orientation.

In other embodiments, the arrangement of the adjustment block 400 is not limited to being set at the sixth hinged end 250. For example, in another embodiment, the adjustment block 400 may be arranged at the fifth hinged end 150, so that the adjustment block 400 moves along the slide rail 310. Referring to FIGS. 7, 8, and 9, in another embodiment, the adjustment block 400 may be arranged at the first hinged end 110 or the third hinged end 210, so that the first triangular structure 033 or the second triangular structure 035 have a movable end to achieve deformation. The adjustment block 400 arranged at the first hinged end 110 or the third hinged end 210 requires a sliding groove or other similar structure to be provided on the seat body 010 or the corresponding linking rod, so that the adjustment block 400 can slide within the range of motion.

In another embodiment, the locking assembly can be arranged on the adjustment block 400.

In summary, the seat body 010 can be switched smoothly between the first orientation and the second orientation and occupies a small space. The turning device 030 is arranged under the seat body 010 which further reduces a size of the adjustable seat 001. The seat body 010 in the locked state will not take up much space and will not obstruct the body of the passenger in the adjustable seat 001. The adjustable seat 001 can be used in different kinds of vehicles. The adjustable seat 001 can be switched between the first orientation and the second orientation so that the passenger faces a front or a rear of the vehicle. In addition, the adjustable seat 001 can be locked in different positions between the first orientation and the second orientation to improve a comfort of the passengers.

Figure 10:
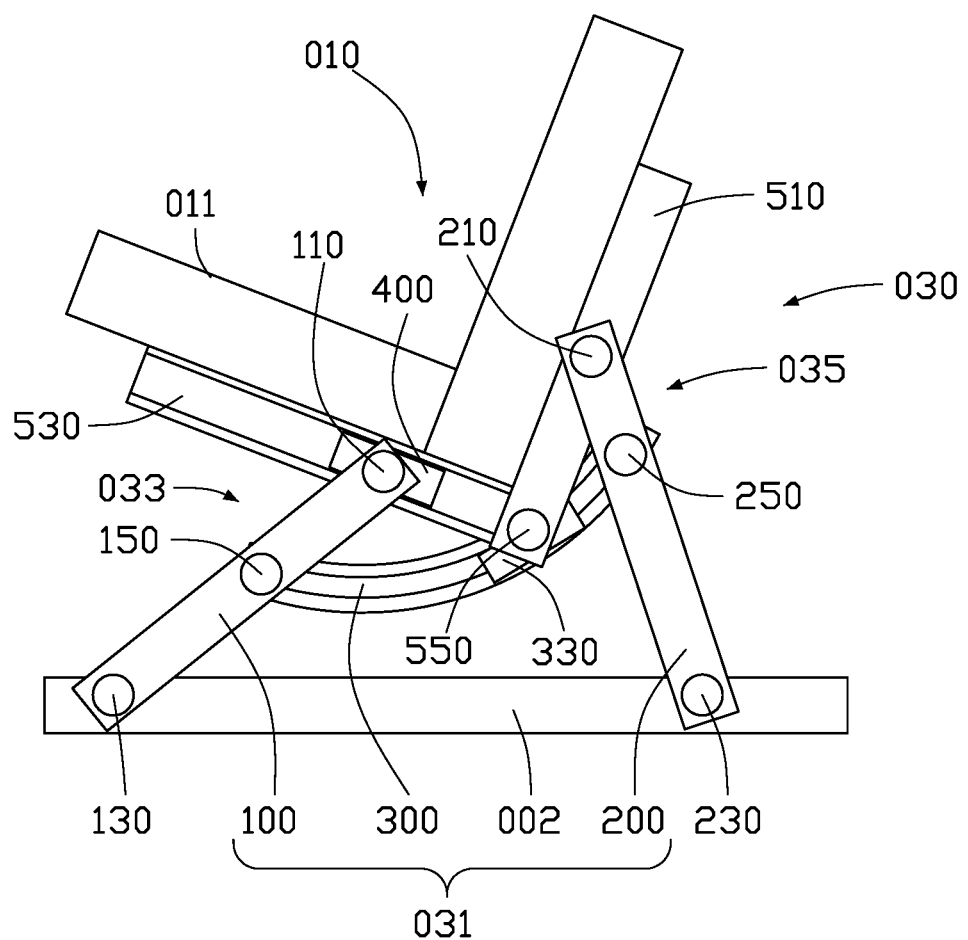
FIG. 10 is a schematic diagram of the adjustable seat according to another embodiment when the seat surface is in the first orientation.
Figure 11:
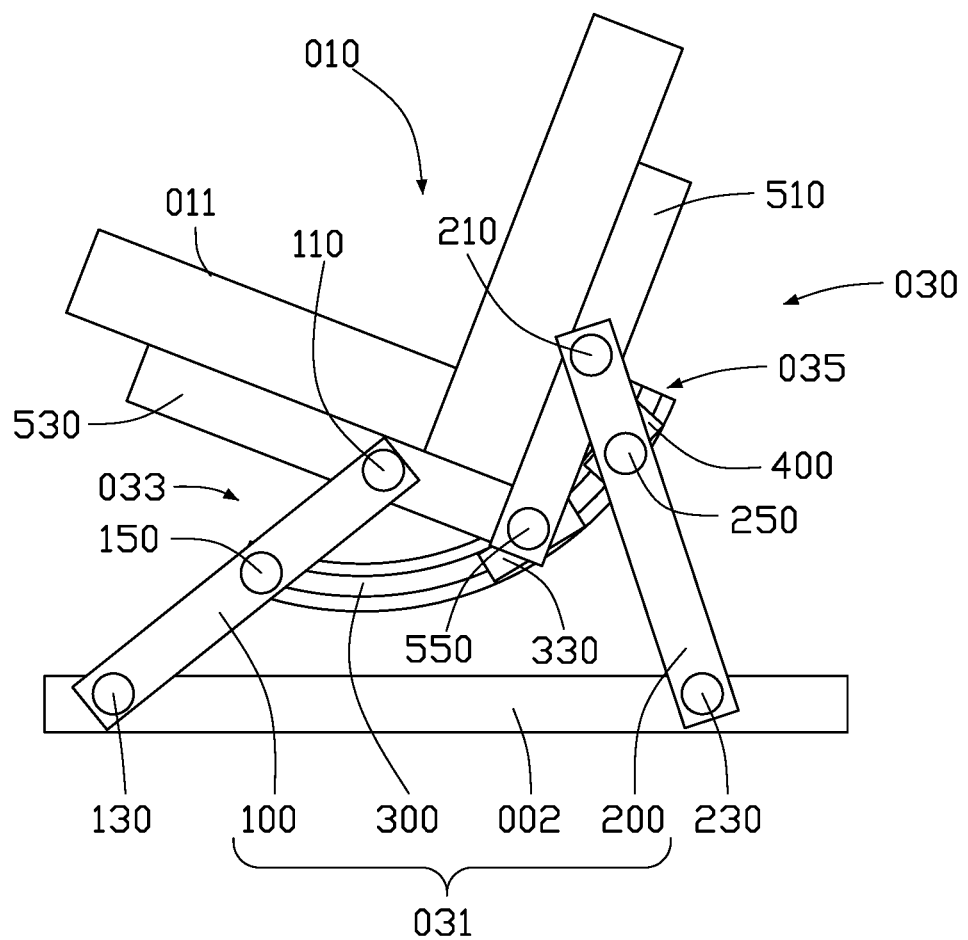
FIG. 11 is a schematic diagram of the adjustable seat according to another embodiment when the seat surface is in the first orientation.

FIGS. 10 and 11 show a second embodiment of the adjustable seat 001. In the second embodiment, the slide rail 310 is an arcuate slide rail 310, and the arcuate slide rail 310 is convex between the fifth hinged end 150 and the sixth hinged end 250 toward the carrier 002.

The curved slide rail 310 can provide a smoother movement for the seat body 010 when the seat body 010 moves between the first orientation and the second orientation.

The adjustable seat 001 can be installed in vehicles such as cars, trains, planes, ships, etc. The adjustable seat 001 is not limited to be installed in vehicles, and can also be installed in any place that provides seats.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An adjustable seat comprising:
   a carrier;
   a seat body arranged on the carrier and comprising a seat surface, the seat surface switchable between a first direction and a second direction;
   a first linking rod comprising a first hinged end and a second hinged end, the first hinged end hinged to the seat body, and the second hinged end hinged to the carrier;
   a second linking rod comprising a third hinged end and a fourth hinged end, the third hinged end hinged to the seat body, and the fourth hinged end hinged to the carrier;
   a sliding mechanism comprising a slide rail and a slide block slidably engaged with the slide rail, the slide block hinged to the seat body, the slide rail comprising a fifth hinged end and a sixth hinged end, the fifth hinged end hinged to the first linking rod, and the sixth hinged end hinged to the second linking rod; and
   an adjustment block slidably coupled to the slide rail or the seat body for switching the seat surface between the first direction and the second direction, one of the first hinged end, the third hinged end, the fifth hinged end, and the sixth hinged end provided on the adjustment block.

2. The adjustable seat of claim 1, wherein:
   the seat body comprises a first piece and a second piece hinged to the first piece by a connecting shaft; and
   the slide block and the seat body are hinged together through the connecting shaft.

3. The adjustable seat of claim 1, wherein:
   the slide rail is a linear slide rail.

4. The adjustable seat of claim 1, wherein:
   the slide rail is an arcuate slide rail; and
   the arcuate slide rail is convex toward the carrier between the fifth hinged end and the sixth hinged end.

5. The adjustable seat of claim 1, wherein:
   the adjustment block is slidably coupled to the slide rail; and
   the fifth hinged end or the sixth hinged end is arranged on the adjustment block.

6. The adjustable seat of claim 1, wherein:
   the adjustment block is slidably arranged on the seat body; and
   the first hinged end or the third hinged end is arranged on the adjustment block.

7. The adjustable seat of claim 1, wherein:
   the sliding mechanism is provided with a locking assembly for locking a relative position of the slide block on the slide rail.

8. The adjustable seat of claim 7, wherein:
   the locking assembly comprises a plug arranged on the slide block;
   a plurality of holes is defined at intervals along an extension direction of the slide rail; and
   the plug is inserted into a corresponding one of the plurality of holes to fix the relative position of the slide block and the slide rail.

9. The adjustable seat of claim 8, wherein:
   the plug is rotationally coupled to the slide block; and
   a return member is provided between the plug and the slide block to drive the plug toward the plurality of holes.

10. The adjustable seat of claim 8, wherein:
    ball bearings are provided between the slide block and the slide rail.

11. An adjustable seat comprising:
    a carrier;
    a seat body arranged on the carrier and comprising a seat surface, the seat surface switchable between a first direction and a second direction;
    a first linking rod comprising a first hinged end and a second hinged end, the first hinged end hinged to the seat body, and the second hinged end hinged to the carrier;
    a second linking rod comprising a third hinged end and a fourth hinged end, the third hinged end hinged to the seat body, and the fourth hinged end hinged to the carrier;
    a sliding mechanism comprising a slide rail and a slide block slidably engaged with the slide rail, the slide block hinged to the seat body, the slide rail comprising a fifth hinged end and a sixth hinged end, the fifth hinged end hinged to the first linking rod, and the sixth hinged end hinged to the second linking rod; and
    an adjustment block slidably coupled to the slide rail or the seat body for switching the seat surface between the first direction and the second direction, one of the first hinged end, the third hinged end, the fifth hinged end, and the sixth hinged end provided on the adjustment block, wherein:

the first linking rod, the second linking rod, the carrier, and the sliding mechanism form a four-rod linkage structure for adjusting positions of the first hinged end and the second hinged end.

12. The adjustable seat of claim 11, wherein:

any one of the first linking rod, the second linking rod, or the sliding mechanism is used to adjust positions of the first hinged end and the second hinged end to cause a distance between the first hinged end and the carrier to be greater than a distance between the third hinged end and the carrier, or cause the distance between the third hinged end and the carrier to be greater than the distance between the first hinged end and the carrier.

13. The adjustable seat of claim 12, wherein:

the first hinged end, the fifth hinged end, and the slide block form a first triangular structure;

the third hinged end, the sixth hinged end, and the slide block form a second triangular structure;

the first triangular structure and the second triangular structure reduce a degree of freedom of the four-bar structure in turn; and the adjustment block restores the degree of freedom reduced by the first triangular structure, and the slide block slidably engaged with the sliding mechanism restores the degree of freedom reduced by the second triangular structure.

* * * * *